United States Patent
Eloo et al.

(10) Patent No.: US 9,962,634 B2
(45) Date of Patent: May 8, 2018

(54) FILTRATION DEVICE

(75) Inventors: Michael Eloo, Xanten (DE); Andre Rosengaertner, Bocholt (DE)

(73) Assignee: GALA INDUSTRIES, INC., Eagle Rock, VA (US)

( * ) Notice: Subject to any disclaimer, the term of this patent is extended or adjusted under 35 U.S.C. 154(b) by 821 days.

(21) Appl. No.: 13/880,480

(22) PCT Filed: Oct. 22, 2010

(86) PCT No.: PCT/EP2010/006481
§ 371 (c)(1),
(2), (4) Date: Apr. 19, 2013

(87) PCT Pub. No.: WO2012/052045
PCT Pub. Date: Apr. 26, 2012

(65) Prior Publication Data
US 2013/0199972 A1    Aug. 8, 2013

(51) Int. Cl.
*B01J 49/00*    (2017.01)
*B01D 33/46*    (2006.01)
*B01D 33/04*    (2006.01)

(52) U.S. Cl.
CPC ........... *B01D 33/461* (2013.01); *B01D 33/04* (2013.01)

(58) Field of Classification Search
None
See application file for complete search history.

(56) References Cited

U.S. PATENT DOCUMENTS

| 4,052,305 | A |   | 10/1977 | Arvanitakis |
| 4,411,390 | A | * | 10/1983 | Woten ............... B65G 53/46 241/159 |
| 4,485,013 | A |   | 11/1984 | Cockman |
| 4,979,315 | A |   | 12/1990 | Pierson |
| 5,091,753 | A | * | 2/1992 | Slapelis ............ G03G 21/0029 15/256.51 |
| 2002/0043730 | A1 | * | 4/2002 | Chong ................. B01J 13/02 264/4.1 |
| 2002/0170765 | A1 | * | 11/2002 | Bauer .................. E01H 12/00 180/308 |

(Continued)

FOREIGN PATENT DOCUMENTS

| CN | 1057402 | 1/1992 |
| CN | 1084424 | 3/1994 |
| DE | 1667134 | 6/1971 |

(Continued)

*Primary Examiner* — Richard C Gurtowski
(74) *Attorney, Agent, or Firm* — Jacobson Holman, PLLC

(57) ABSTRACT

A filtration apparatus for filtering and separating solids from liquids is provided that includes at least one liquid-permeable, continuously or intermittently drivable filter belt, an intake for charging the liquid/solid mixture to be filtered onto the filter belt in a charging zone and a belt cleaner for removing the solids deposited at the filter belt from a belt section conveyed out of the charging zone in an expulsion zone. The belt cleaner has at least one rotatingly drivable brush with which a brush cleaner having a scraper is associated which is arranged in the path of the bristles of the rotating brush. The rotating brush efficiently removes the deposited solids from the filter belt, while the scraper of the brush cleaner simultaneously ensures that the dissolved solids do not settle at the brush and clog it.

19 Claims, 5 Drawing Sheets

(56) References Cited

U.S. PATENT DOCUMENTS

2003/0121843 A1* 7/2003 Bratten ................ B01D 29/096
                                                           210/398
2008/0017479 A1* 1/2008 Ostman .................. B65G 45/12
                                                           198/497

FOREIGN PATENT DOCUMENTS

| DE | 3926434 | 3/1990 |
|----|---------|--------|
| DE | 9402095.7 | 7/1994 |
| DE | 20008957 | 9/2000 |
| DE | 10154134 | 5/2003 |
| DE | 10252679 | 5/2004 |
| EP | 0458413 | 11/1991 |
| EP | 0587223 | 3/1994 |
| EP | 0622099 | 9/1999 |
| EP | 1762291 | 3/2007 |
| JP | 57-168535 | 3/1982 |
| JP | 04045898 | 2/1992 |
| JP | H07-108108 | 4/1995 |
| JP | 2001-315313 | 11/2001 |
| JP | 2002-248304 | 9/2002 |
| JP | M296077 | 8/2006 |

* cited by examiner

FILTRATION DEVICE

This is a national stage of PCT/EP10/006481 filed Oct. 22, 2010 and published in German, hereby incorporated by reference.

BACKGROUND OF THE INVENTION

1. Field of the Invention

The present invention relates to a filtration apparatus for filtering and separating solids from liquids comprising at least one liquid-permeable, continuously or intermittently drivable filter belt, an intake for charging the liquid/solid mixture to be filtered onto the filter belt in a charging zone and a belt cleaner for removing the solids deposited at the filter belt from a belt section conveyed out of the charging zone in an expulsion zone.

2. Description of the Related Art

A pelletizing apparatus is known from the document DE 101 54 134 A1 whose process liquid is conducted through a particle filter in the form of a liquid coolant in a circuit to filter and separate from the process liquid contaminants which enter into the process liquid during pelletizing or granulation. A filter belt running around continuously in the manner of a conveyor belt is provided as a particle filter in this respect, with the contaminated process liquid to be filtered being charged onto said filter belt so that the liquid runs through the upper run and lower run of the filter belt and particles are collected on the filter belt. The contaminants collected on the belt are transported away and are removed continuously from the belt using a scraper in an expulsion zone.

The use of continuously or intermittently drivable filter belts for filtering contaminated liquids is in particular advantageous in industrial plants in which process liquid is conducted in a circuit since the plant does not need to be stopped to clean the filter. The solids deposited on the filter belt in the charging zone are conducted out of the charging zone by the movement of the filter belt so that they can be removed from the filter belt in an expulsion zone which is disposed outside said charging zone. At the same time, a fresh or cleaned filter belt section is newly moved into the charging zone by the movement of the filter belt so that a fresh, functional filter belt section always carries out the filtration there.

The previously known filtration apparatus of this category are, however, needful of improvement in a number of respects. In this respect, one problem relates to the cleaning and servicing of the filter belt. The solids collecting both at the upper run and at the lower run of the filter belt in the apparatus in accordance with DE 101 54 134 A1 cannot be removed easily before the respective run of the filter belt is conducted around the deflection roller disposed in the interior of the filtration apparatus since a filter belt section is not first conducted into the expulsion zone via the scraper arranged there before the corresponding filter belt section in the interior of the filtration apparatus changes from the lower run to the upper run or—depending on the direction of rotation—from the upper run to the lower run. Not only the solids deposited at the filter belt are hereby conducted around the deflection roller disposed in the interior of the filtration apparatus, which results in solidification, but also in wear at the belt and deflection roller, but also the filter belt section covered with solids in the upper run is used for filtration again without previously having been cleaned.

Furthermore, problems can result in the cleaning off of the filter belt in the expulsion zone which require separate cleaning measures and thus a standstill of the filtration apparatus. On the one hand, this can be due to the fact that deposits solidified at the filter band cannot be completely scraped off and accumulate more and more on a repeated running around of the filter belt so that the filter belt clogs. On the other hand, the solids removed from the filter belt can accumulate at the scraper so that an accumulation can result there which requires a maintenance standstill of the filtration apparatus.

On such maintenance standstills, the handling of such filtration apparatus having a revolving filter belt has previously been much more complex than with stationary edge split filters. If, for example, the filter belt has to be completely replaced, the removal of the filtration apparatus is considerably more complex since the deflection roller in the interior of the filtration apparatus also has to be removed, at least for the installation of a new continuously running filter belt, if the ends of a non-continuous filter belt should not be connected to one another subsequently, i.e. after threading in said non-continuous filter belt.

Starting from this, it is the underlying object of the present invention to provide an improved filtration apparatus of the initially named type which avoids disadvantages of the prior art and further develops the latter in an advantageous manner. Longer operating cycles with fewer and shorter maintenance downtimes should preferably be achieved without impairing the filtration efficiency. Furthermore, an easier replaceability of the filter belt should preferably be made possible to be able to carry out adaptations of the filtration apparatus to different process liquids or to solids contained therein.

SUMMARY OF THE INVENTION

This object is achieved in accordance with the invention by a filtration apparatus for filtering and separating solids from liquids, comprising at least one liquid-permeable, continuously or intermittently drivable filter belt, an intake for charging the liquid/solid mixture to be filtered onto the filter belt in a charging zone as well as a belt cleaner for removing the solids deposited at the filter belt from a belt section conveyed out of the charging zone in an expulsion zone. The belt cleaner has a rotationally driven brush with which a brush cleaner having a scraper is associated which is arranged in the revolving path of the bristle field of the bush.

To avoid downtimes as well as impairments of the filtration efficiency by solid accumulations which form in the region of the belt cleaner, it is proposed to use a brush for the removal of the solids deposited at the filter belt, said brush being designed as self-cleaning so that not only a permanently effective removal of the solids from the filter belt is ensured, but also material accumulations at the cleaning brush and downtimes required for their removal are avoided. In accordance with the invention, the belt cleaner has at least one rotatingly drivable brush with which a brush cleaner having a scraper is associated which is arranged in the path of the bristles of the rotating brush. The rotating brush efficiently removes the deposited solids from the filter belt, while the scraper of the brush cleaner simultaneously ensures that the dissolved solids do not settle at the brush and clog it. The continuous self-cleaning of the brush is in particular very helpful with sticky contaminants of the liquid to be filtered in order to be able to ensure a permanently efficient, continuous separation of the solids.

The scraper used for the self-cleaning of the rotatingly drivable brush can generally be designed in different ways.

In accordance with an advantageous embodiment of the invention, said scraper can be formed as a bar-shaped wiper which is preferably held completely immiscible into the bristle field of the brush. The wiper can in this respect extend for this purpose parallel to the axis of rotation of the brush, optionally also at a slight, acute-angled slanted position, at a spacing from the axis of rotation of the brush which is smaller than the radius of the enveloping surface of the brush so that the bristles of the rotating brush continually knock against the wiper on their path or cyclically come into engagement therewith.

Said bar-shaped wiper can in this respect be arranged stationary in operation, i.e. in a fixed position relative to the brush. If a circular cylindrical bar is provided as a scraper, a completely rigid, immobile arrangement can be provided.

In a further development of the invention, the position of the scraper can also be varied relative to the brush, for example such that the scraper can be delivered closer to the axis of the brush or can be removed further away from it in order to achieve a scraping effect which is now more, now less pronounced, or to be able to adjust the scraper in dependence on the wear of the brushes. Alternatively or additionally, the support of the scraper can also have a movability such that the scraper can be arranged in different peripheral segments so that the scraping procedure can be carried out at different points, for example to avoid a splash-back of the scraped off solids onto the filter belt. In an advantageous further development of the invention, the scraper for the brush can be arranged on the side of the brush disposed opposite the filter belt. If the point of engagement of the brush at the filter belt defines the angular position 0°, the scraper can, for example, be arranged in an angular segment between 90° and 270°, that is, so-to-say, in the second and third quadrants of the revolutionary movement of the brush. In an advantageous further embodiment of the invention, the scraper can, for instance, be arranged in the range between 150° and 210° in order reliably to prevent solids from being splashed back onto the filter belt on the scraping off of the solids by the brush. If the named angular position of the scraper can be adjusted by a correspondingly movable support of the scraper, the scraping off can be ideally set for different solids and bristle types.

In a further development of the invention, the bar-shaped wiper can also have a cross-section differing from the circular, for example have webs radially projecting in the manner of an extruded section, have a triangular or polygonal contour or have a pattern of mutually offset engagement projections, in particular when the wiper is rotationally drivable, preferably in the opposite direction to the direction of rotation of the brush, so that the engagement effect between the wiper and the bristles is increased and an improved removal of the solids from the bristles is achieved.

Alternatively to extruded sections of the scraper bar, it can also have a section with a component varying in the longitudinal direction, in particular in the form of a screw section or of a slanted grooving to achieve a conveying direction in the longitudinal direction of the scraper. Solids which are present in an increased amount at the center of the brush can, for example, hereby be homogenized over the length of the brush and transported off to the side. The bar-shaped wiper can have a herringbone gearing or a herring bone contour for this purpose, for example. The named screw sections or slanted sections can in this respect have the previously named extruded sections superimposed on them.

Alternatively or additionally to such a scraper in the form of a wiper, a second brush can also be used for the self-cleaning of the brush which is advantageously likewise designed as a rotationally drivable brush and is rotatable about an axis of rotation which extends substantially parallel or slightly slanted, inclined at an acute angle to the axis of rotation of the first brush. Such a second brush is advantageously driven in the opposite direction to the first brush to remove solids adhering in the first brush from said first brush. In a further development of the invention, a further brush cleaner can in turn be associated with the second brush, for example in the form of a wiper as previously described.

To be able to adapt the cleaning of the filter belt ideally to different process conditions, the brush brushing off the filter belt has a drive with a variable speed so that the brush speed is changeable and can be set to the respective ideal value.

In a further development of the invention, an automatic regulation or setting of the brush speed is provided in this respect which achieves an ideal filter belt cleaning for the respective present process conditions. For this purpose, the control apparatus can be connected to detection means which detects different operating parameters in dependence of which the control apparatus then automatically sets the speed. For example, the detection means can include a load sensor system with the aid of which the filter load, i.e. the solid quantity placed on the filter belt and/or the remaining filter permeability is determined so that, for example as the filter load increases, a higher brush speed is set, whereas as the filter load decreases, a lower speed is set. Alternatively or additionally, the named detection means can also include a solid density sensor system to determine the portion of the solids in the liquid to be filtered and/or to determine the ratio of liquid quantity to solid quantity. If the portion of the solids in the liquid to be filtered increases, the brush speed can be increased, for example, while the speed can be lowered as the solid quantity falls. Alternatively or additionally, the named detections means can include a particle size sensor system to determine the particle size of the adhering solid particles. If the particle size increases, the speed can be increased, for example, whereas with smaller particles work can be carried out at a lower brush speed. Alternatively or additionally, for example, the solid material can also be used as a parameter with reference to which the brush speed is set. Alternatively or additionally, a feedback regulation of the brush speed can take place such that the filter belt section cleaned by the brush is observed and is monitored with respect to its cleanliness, for example by optical sensors or a determination of the air permeability and/or liquid permeability of the belt. The brush speed is then regulated such that the largest possible cleanliness of the filter belt results downstream of the brush. Further operating parameters can be used in this speed regulation of the cleaning brush.

Alternatively or additionally to the regulation of the brush speed in dependence on the different operating parameters, the speed of the brush can also be cyclically varied or reversed, for example such that a cleaning procedure is carried out at an increased brush speed or with a reversed direction of rotation of the brush on every nth revolution of the filter belt.

Alternatively or additionally to a varying of the brush speed, in a further development of the invention the contact force of the brush against the filter belt can also be varied, in particular by changing the spacing of the brush axis from the filter belt. The contact pressure and/or the spacing of the brush axis from the filter belt can be automatically controlled in a corresponding manner by the named control apparatus in dependence on different operating parameters, for example such that when the cleaning effect deteriorates or on a higher filter load, the brush is delivered more forcefully to the filter belt. The other force of the brush can also be cyclically varied in the named manner, for example such that a cleaning cycle is carried out with increased contact pressure on every nth revolution of the filter belt.

Alternatively or additionally to a change in the brush speed and/or in the contact force of the brush, the movement speed of the filter belt can also be varied in an advantageous further development of the invention. For this purpose, a drive having variable drive speed is associated with the filter belt. A manual regulator can advantageously be associated with this drive to be able to vary the filter belt speed manually. Alternatively or additionally, an automatic control apparatus can be provided for automatically varying the filter belt speed in dependence on at least one operating parameter, with advantageously the aforesaid operating parameters being able to be used, that is in particular the filter load, the solid density and the ratio of the liquid quantity to the solid quantity, the particle size, the solid material or a characteristic value of the filter belt such as its mesh size or pore size or its liquid permeability. The belt speed can in particular be increased, for example as the filter load increases or as the solid portion in the liquid/solid mixture to be filtered increases, while the belt speed can be reduced as the filter load decreases or as the solid portion decreases.

The named belt cleaner can generally be positioned in different sections of the filter belt and/or of the expulsion region. In an advantageous further development of the invention, the brush is brought into engagement with a lower run of the filter belt, and indeed preferably from a lower side so that the brush processes the filter belt side onto which the solid/liquid mixture to be filtered is charged in the charging zone of the filtration apparatus.

In order to be able to carry out additional cleaning measures or to replace the filter belt as required in a maintenance cycle, provision is made in accordance with a further aspect of the present invention that the drivable filter belt is combined with the named belt cleaner to form an assembly which is made separately from the intake of the filtration apparatus and is movably supported with respect to this intake. The named assembly including the filter belt, its drive and the belt cleaner can in particular be made in drawer-like form so that the named assembly or the section of the filter belt to be positioned for the filtration procedure in the charging zone can be inserted into or pulled out of the filter housing in the manner of a drawer without previously dismantling the named assembly into its components. The filter housing of the filtration apparatus for this purpose advantageously has an insertion opening at an upright housing wall so that the named assembly can be pushed into or pulled out of the filter housing from the side.

To simplify the handling on the withdrawal and insertion of the filter belt assembly, provision is made in an advantageous further development of the invention that the named assembly forms a trolley which is supported at the base by an undercarriage and/or is movably guided by a sliding guide at the filter housing. The total assembly can hereby be withdrawn without the fitter or user having to take up the total weight of the filter assembly. An easy moving in and out can be achieved by the trolley-like design of the assembly with an undercarriage.

To achieve an exact positioning of the filter belt in the charging zone and/or an exactly fitting cooperation between the intake and the filter belt without having to carry out positioning work with difficult access in the interior of the filter housing for this purpose, in a further development of the invention, a connector collar surrounding the filter belt is provided at the named drawer-like assembly which can be connected to the filter housing and forms an abutment and/or a positioning apparatus which exactly predefines the desired position of the filter belt in the charging zone on engagement with the filter housing. If the drawer-like assembly is pushed into the filter housing filter-belt first until the named connector collar comes into contact at the filter housing, the part of the drawer-like assembly extending in the interior of the filter housing is exactly positioned in the charging zone, while the remaining part of the assembly including the belt cleaner and the expulsion zone is arranged outside the filter housing.

To prevent the solid/liquid mixture to be filtered from passing through the filter belt or different portions thereof a multiple of times before the different sections are cleaned up, the filtration device is designed in accordance with a further aspect of the present invention such that the solid/liquid mixture is only conducted through the same filter belt once. The named filter belt is accordingly advantageously nevertheless conveyed around deflection rollers in the manner of a belt conveyor so that the filter belt extends in the charging zone of the filtration apparatus with an upper run and a lower run, with the filter belt in particular being able to be designed as a continuously revolving belt conveyor. In order nevertheless to prevent the solid/liquid mixture from passing through both the upper run and the lower run, the filtration apparatus, in a further development of the invention, has a lead-off surface between the named upper run and the lower run of the filter belt in the section of the filter belt conveyor disposed in the charging zone to lead off liquid led through the upper run past the lower run. The named lead-off surface intercepts the liquid passed through the upper run before the lower run and leads it past the lower run into the further part of the liquid circuit.

The named lead-off surface can in this respect generally have different designs, for example in the form of a slanted surface inclined to one side. In a further development of the invention, the named lead-off surface can have a—roughly spoken—saddle-roof-like contour whose ridge is aligned substantially parallel to the running direction of the filter belt and is oriented toward the upper run so that the liquid intercepted by the lead-off surface is led off toward both sides past the lower run.

In a further development of the invention, the named lead-off surface in this respect has flow direction elements, preferably in the form of flow direction rails, extending transversely to the running direction of the filter belt to calm the intercepted liquid and to damp the longitudinal component originating from the filter belt and to lead off the intercepted liquid directly in the desired direction.

In a further development of the invention, the named lead-off surface can be made in tub-form to prevent an uncontrolled overflow or running off of the intercepted liquid. The named lead-off surface can in particular have upturns, elevated portions or retaining contours formed in another manner at lateral marginal regions to be able to achieve a controlled leading off of the intercepted liquid.

Belt guiding rails can in particular be provided at the named lead-off surface which engage around or cover the upper run of the filter belt at is lateral margins and laterally bound the charging zone. Such belt guiding rails do not only satisfy the purpose of guiding the filter belt and preventing any excessive sag or kinking of the filter belt under the charged load, but also prevent an uncontrolled washing over of the upper run of the filter belt, which could result in an unfiltered overflow. The named belt guiding rails projecting laterally over the filter belt margins hold back the charged solid/liquid mixture in the region of the upper run so that the named mixture passes substantially completely through the upper run of the filter belt and is hereby filtered. The named interception or lead-off surface between the upper run and the lower run is hereby given a dual function such that, on the one hand, the liquid intercepted beneath the upper run is led off past the lower run and, on the other hand, the complete filtration through the upper run is ensured.

To be able better to handle the product to be removed from the filter belt and in so doing simultaneously to be able to effect the belt cleaning more easily, in accordance with a further aspect of the present invention, a drying apparatus for drying the solids accumulated at the filter belt is associated with the filter belt between the charging zone and the expulsion zone of the filtration apparatus. The accumulated solids do not necessarily have to be completely dried in this process, but can be surface dried or desiccated to a specific degree, with different degrees of drying being able to be achieved depending on the application. The drying apparatus can for this purpose generally be made in different manners and can optionally include a plurality of drying means arranged next to one another or behind one another. In a further development of the invention, the drying apparatus can have at least one energy radiator, for example in the form of an infrared radiator, to apply radiation energy to the filtration product adhering to the filter belt. Alternatively or additionally, the drying apparatus can have at least one air flow generator, for example in the form of a fan or of a sucker. The solids adhering to the filter belt can have drying air applied to them by means of such an air flow generator so that they can be released from the filter belt more easily by the previously named belt cleaner and can be further processed more easily.

Further drying means can be used for a further drying of the solids. For example, a cyclone separator, a vacuum pump or other moisture-removing means can be provided.

In a further development of the invention, different filter belts can be provided behind one another in a stage, tandem or multiple arrangement, with different filter belts preferably being designed differently. In a further development of the invention, different filter units can be provided behind one another in the manner of a cascade to filter ever finer solid particles. Alternatively, however, filter belts of the same type of design can form part of the filter apparatus in different arrangements with respect to one another.

The filter belt or the filter belts can generally be of different design, with natural or synthetic fibers in the form of fabric or mesh being able to be used in processed form as the filter medium. Alternatively or additionally, treated and/or coated filter media can also be provided. For example, fiber materials can be manufactured from polycondensates and their copolymers or from polyolefins and their copolymers. The filter belt is advantageously made as a continuous belt and is therefore maintenance-free and reusable. The continuous belt can in this respect be produced by joining the ends of a filter belt first made in non-continuous form, with the two ends of the filter belt each being able to be adhesively bonded, welded, pressed, threaded, linked, screwed, sewn or otherwise fixedly or separably connected to one another depending on the design of the filter belt. The material of the filter belt can be formed as synthetic fabric in a single-layer or multi-layer design or it can be made in warp or weft connection and optionally as antistatic. Alternatively or additionally, a finely woven stainless steel fabric in an uncoated or coated design or a fixed and/or coated glass fiber fabric can be used as a filter belt. The filtration fineness is matched to the respective process or to the solids occurring in the respective process and to the process liquids used in this process, with a good compromise being able to be provided for different uses having a filtration fineness in the range from 0.05 to 0.25, and in particular 0.15 mm.

To facilitate a uniform charging of the solid/liquid mixture to be filtered, in an advantageous further development of the invention, the intake comprises a charging bed which is provided with dam stages and which includes an outflow or charging opening which is only reached by the solid/liquid mixture to be filtered after flowing over at least one dam stage. Advantageously, the solid/liquid mixture to be filtered is hereby charged onto the filter belt approximately free of eddies and/or turbulence so that the named mixture propagates on the filter belt with a laminar flow.

Instead of the named dam stages, other or additional flow control means can also be used which calm the charge flow, for example in the form of fins, corrugations, projections or other speed-reducing and/or calming flow means which homogenize the charge flow. The intake can include, in a further embodiment of the invention, an intake tub whose base is inclined in a sloped manner in the longitudinal direction of the filter belt and leads to an outflow opening which can be of different contour, preferably oval, elliptic or rectangular with rounded corners. A uniform application of the liquid onto the filter belt can be achieved by a rounded contour of the outlet opening of the charging tub. The aforesaid flow means for calming, homogenizing or slowing the charge flow can be arranged upstream of the named outlet opening in the region of the sloped base of the charging tub.

BRIEF DESCRIPTION OF THE DRAWINGS

The present invention will be explained in more detail in the following with reference to a preferred embodiment and to accompanying drawings. There are shown in the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the in are given by way of illustration only, since various changes and modifications within the spirit and scope of the invention will become apparent to those skilled in the art from this detailed description.

The filtration apparatus 1 shown in the Figures includes a filter housing 2 through which liquid contaminated with solids is conducted for the purpose of filtration. The liquid to be filtered can in this respect serve different purposes, for example as a process liquid of an industrial plant guided in a circuit. Cooling liquids such as oil or water which are conducted in a circuit can be considered here for the cooling of machine tools or other production plants in which particular contaminants of the process liquid occur whose reclaiming is necessary or worthwhile. The cleaning of cooling water which is contaminated by environmental substances such as leaves and the like can also be considered.

The use of the filtration apparatus 1 is particularly advantageous in pelletizing apparatus for pelletizing plastics such as ring pelletizers or extrusion pelletizers and in particular underwater pelletizers in which the pelletized plastics are added to a process liquid circuit. The granulated pellets are removed in this process by usual separators; smaller contaminations by plastic particles can then be filtered and separated by the shown filtration apparatus. In this case, the filtration apparatus shown is connected into the process liquid circuit downstream of the pellet separator.

Figure 1:
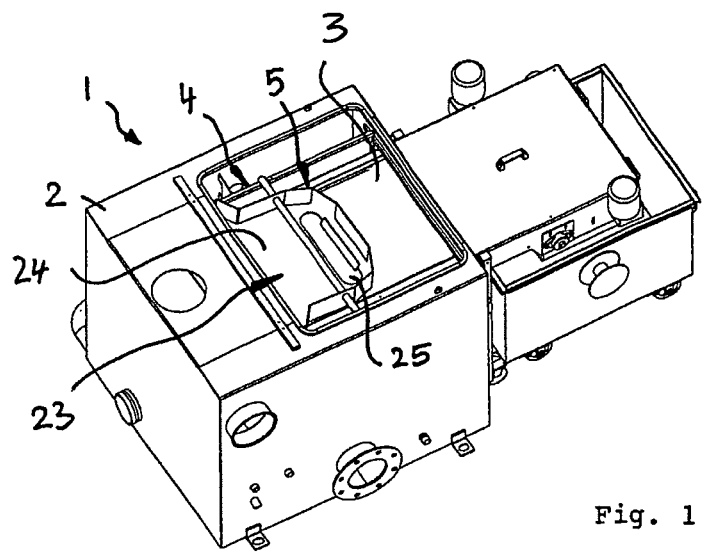
FIG. 1: a schematic, perspective representation of the filtration apparatus in accordance with an advantageous embodiment of the invention, wherein the charging zone of the filtration apparatus is shown obliquely from above so that the charging tub arranged in the intake and the filter belt located thereunder can be seen.
Figure 2:
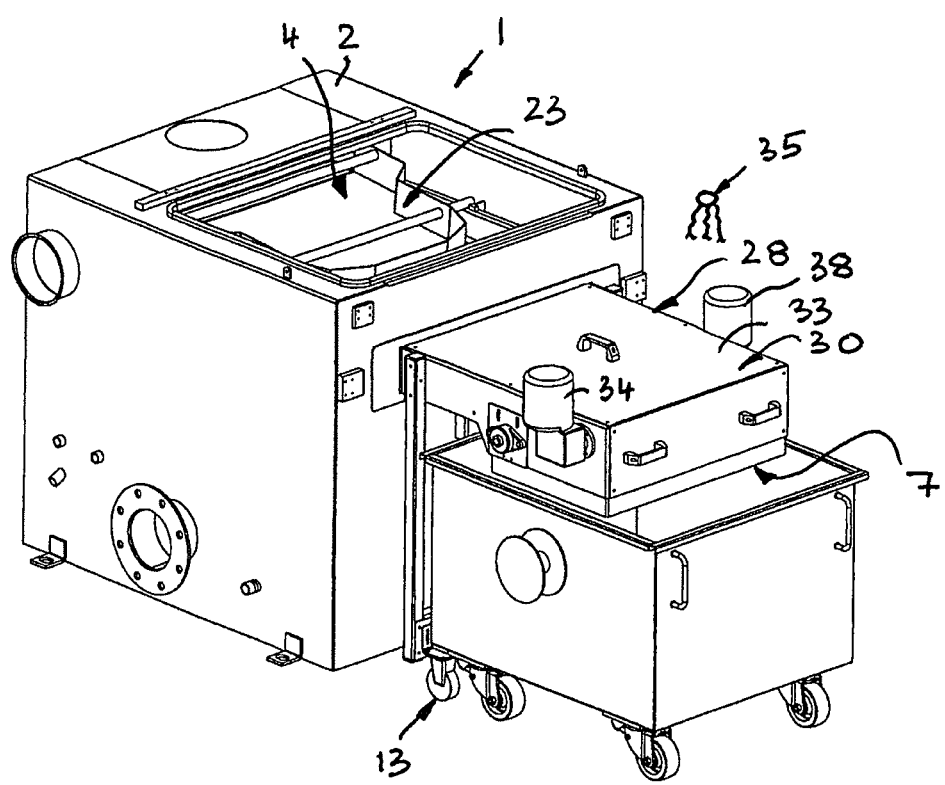
FIG. 2: a schematic, perspective representation of the filtration apparatus of FIG. 1 from a different angle which shows the part of the filter belt located outside the filter housing as well as the collection tank for the filtered solids arranged beneath the expulsion zone.
Figure 3:
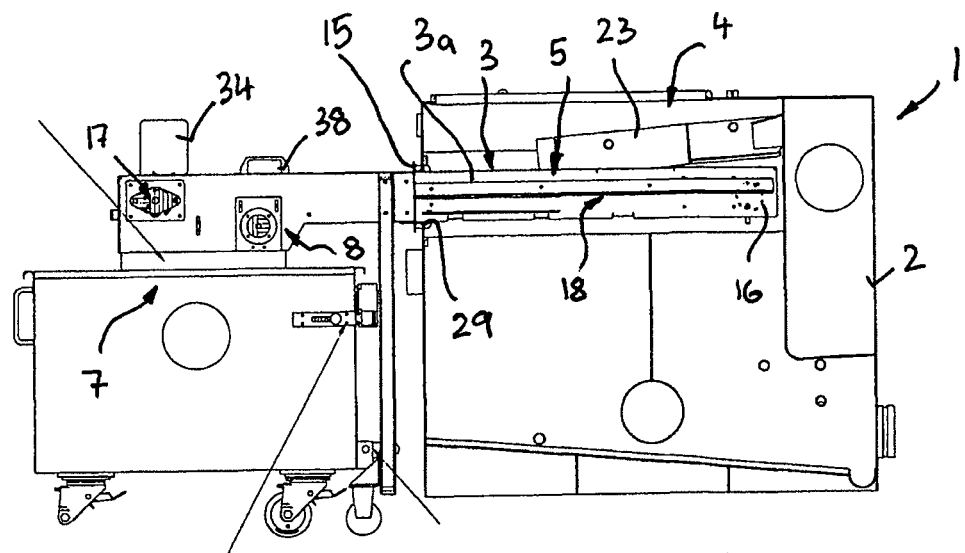
FIG. 3: a side view of the filtration apparatus of the preceding Figures which is drawn as a sectional representation in the region of the filter housing to show the filter belt arranged in the interior of the filter housing and the intake associated therewith.

The solid/liquid mixture to be filtered is added into the interior of the filter housing 2 via an intake 4 and is added via a charging tub 23 in a charging zone 5 to a continuously or intermittently drivable filter belt 3 which is located in a lying alignment, i.e. horizontally, or in an alignment only slightly inclined at an acute angle to the horizontal. In the embodiment shown, the filter belt 3 is horizontally aligned, cf. FIG. 3.

The filter belt 3 shown is located in this respect in an upper region, for example in an upper third of the interior of the filter housing 2 so that the process liquid passing through the filter belt 3 can collect in a lower region of the filter housing 2 which simultaneously serves as a liquid tank or as an intermediate store.

Figure 9:
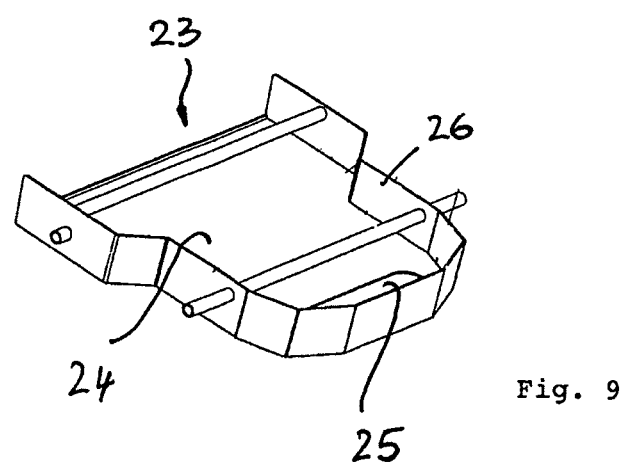
FIG. 9: a perspective, enlarged representation of the charging tub for charging the solid/liquid mixture onto the filter belt.

The named charging tub 23 of the intake 4 is shown in more detail in FIG. 9 and advantageously comprises an inclined base 24 which is inclined toward a sink in an end region of the charging tub 23, wherein an outflow opening 25 is provided in the named sink which has an elongate, oval or slightly elliptic contour in the drawn embodiment, but can also have a different contour specific to the product, for example in the form of a rectangular or polygonal elongated hole. The charging tub 23 advantageously tapers toward the outflow opening 25, i.e. the width transversely to the inclination of the base 24 reduces toward the outflow opening 25, cf. FIG. 9, wherein the tapering can be continuous or stepped. The named base 24 is in this respect limited by a tub edge 26 at the marginal side which is elevated with respect to the base 24 and prevents an overflow at the margin.

The liquid to be purified is guided laterally into the shown charging tub 23 after a calmed, defined overflow and is further calmed by offset dam stages, as required. Such dam stages can be provided in the base 24, with other flow-calming, speed-reducing and/or homogenizing flow control means being able to be formed, however, in particular at the base 24.

The filter belt 3 which is arranged below the outflow opening 25 of the charging tub 23 and aligned in a lying form is designed as a continuously revolving belt conveyor and runs around at least two mutually spaced apart deflection rollers 16, 17 which are supported at a preferably closed carrier frame 27, with lateral support guides being provided at the named carrier frame 27 which can be formed in accordance with the application as a sliding guide coated with a plastic, for example in the form of PE-UHM. Alternatively or additionally, a roller guide having corresponding supported rollers of metal or plastic can be provided in the filter housing 2.

Figure 4:
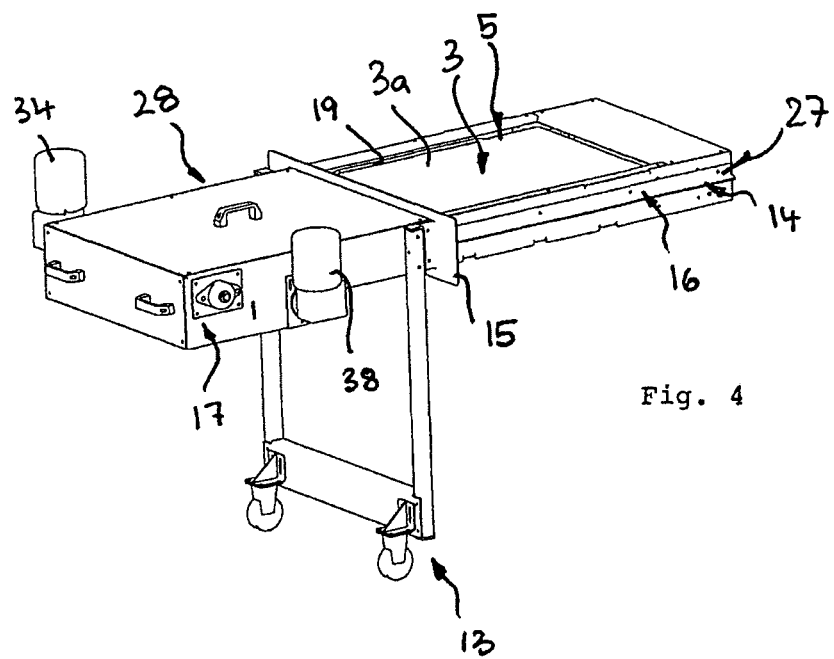
FIG. 4: a perspective, schematic representation of the filter belt assembly comprising the continuously revolving filter belt whose guide means, deflection means and drive means as well as the belt cleaner associated with the filter belt and the undercarriage to support the assembly on the floor.
Figure 5:
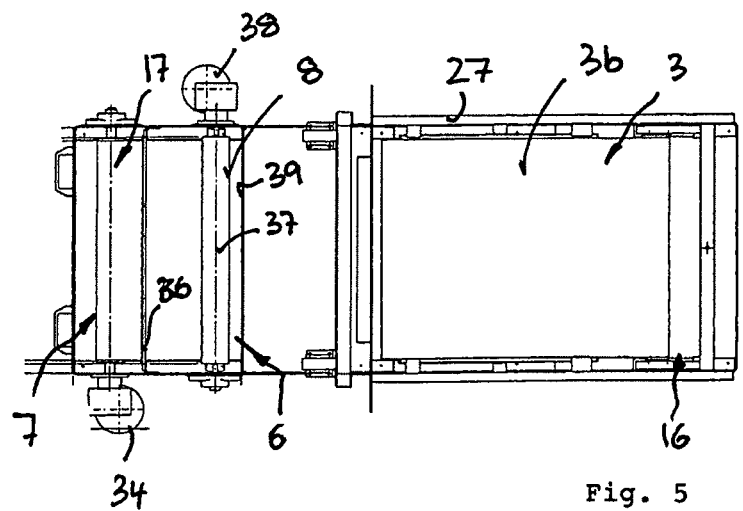
FIG. 5: a plan view of the filter belt of FIG. 4 from below which shows the belt cleaner associated with the lower run of the filter belt and comprising a scraper for coarse cleaning and a self-cleaning brush roll with which a cleaning wiper is associated.

As FIG. 4 shows, the filter belt 3 is part of a drawer-like assembly 28 which can be pushed in and pulled out of the named filter housing 2. For this purpose, the filter housing 2 has an introduction opening 29 in a vertical wall which is formed a little larger in cross-section than the named belt conveyor. In more precise terms, a part of the named assembly 28, namely a part of the filter belt 3 comprising a part of the upper run 3a and a part of the lower run 3b and the deflection roller 16 located therebetween, can be pushed in the manner of a drawer into the named filter housing 2 so that the corresponding sections of the filter belt 3 come to lie beneath the charging tub 23 in the charging zone 5 in a perfectly fitting manner. The other part of the filter belt 3 meanwhile runs outside the filter housing 2 where the filter belt 3 runs through the expulsion zone 7. To position the filter belt 3 appropriately in the filter housing 2 and to close the filter housing 2 sealingly, a connector collar 15 is provided which surrounds the filter belt 3 and which extends substantially perpendicular to the running direction of the filter belt runs. The named connector collar 15 is connected to the filter housing 2 in a sealing manner, for example by a mechanical pressing by means of clamping elements onto the margin of the filter housing 2 surrounding the introduction opening 29. A preferably highly temperature-resistant and/or food-licensed seal can preferably be provided between the filter housing 2 and the connector collar 15 for sealing with respect to the filter housing 2, for example in the form of a ring seal made from a deformable material such as a suitable plastic.

The part of the filter belt 3 projecting out of the filter housing 2 is surrounded by a house-like cover 30 which is formed in box shape in the drawn embodiment and surrounds the projecting part of the filter belt 3 at all sides and is connected to the named connector collar 15. At the lower side, the named cover 30 has an expulsion opening 31 through which cleaned-off solids released from the filter belt 3 are expelled into a collection tank 32 located thereunder.

To pull out and transport the named assembly 28 comprising the filter belt 3, an undercarriage 13 is provided to support the assembly 28, wherein the named undercarriage 13 has rollers or wheels in the drawn embodiment which are arranged on a single axle, with a multi-axial undercarriage being able to be provided, however. Alternatively or additionally to the named undercarriage 13, the assembly 28 can be guided displaceably at the filter housing 2 by a sliding guide 14, wherein the named sliding guide 14 can be provided, for example, at the carrier frame 27 for the filter belt 3, for example in the form of guide rails or guide grooves which are in engagement with guide means made in a complementary manner at the filter housing 2. To prevent an unwanted complete pulling out of the drawer-like assembly 28, a releasable securing element, for example in the form of a securing bolt, can be provided at the inner end of the carrier frame 27 which contacts the filter housing 2 from the inside when the assembly 28 is completely pulled out.

The aforesaid cover 30 advantageously has a releasable top 33 arranged at the upper side in order also to allow access to the filter belt 3 from above. For operation, the top 33 is advantageously sealingly connected to the body of the cover 30.

The drive apparatus 34 for the revolving drive of the filter belt 3 is located in the part of the filter belt 3 located outside the filter housing 2. The named drive apparatus 34 advantageously includes a motor of changeable speed, for example in the form of an electric motor, which optionally drives one of the deflection rollers 17 about which the filter belt 3 is deflected via a transmission which can have a fixed or variable gear ratio. Optionally, the drive apparatus 34 can also drive the filter belt 3 via a separate drive wheel which presses onto the filter belt 3 or is in engagement with it at a suitable point. A drive via the deflection roller 17 is, however, preferred. The named deflection roller 17 which is advantageously made as a roll can have a different design in dependence on the design of the filter belt 3, for example in the form of a ball-shaped roll or a cylindrical roll, with the named deflection roller 17 and/or another deflection roller 16 advantageously being able to have at least one guide groove and/or at least one guide projection, for example in the form of a marginal web projecting laterally next to the filter belt in the end region of the deflection roller, to ensure a straight running out of the filter belt 3. The named filter belt 3 can for this purpose optionally be provided at its inner side with projections engaging into the named guide groove. Alternatively or additionally, at least one of the deflection rollers 16, 17 can include a guide pinion which engages in cut-outs formed in a complementary manner at the filter belt 3. Alternatively or additionally, conversely, a row of teeth, a row of groove sections or a similar section with engagement projections can be provided at the filter belt 3 which engage in engagement projections made in a complementary manner in the peripheral surface of the deflection roller. A slipping through is reliably suppressed by such a pinion engagement between the filter belt 3 and the deflection roller.

The named drive apparatus 34 is advantageously controlled by a control apparatus 35, only indicated schematically, to adapt the belt speed to the process parameters, with the conveying speed in particular being able to be varied in dependence on the ratio of liquid to fines, in particular such that the conveying speed is increased as the particle quantity increases. Alternatively or additionally to the water ratio to fines, other operating parameters can also be considered, as initially explained.

A belt cleaner 6 which continuously cleans off the filter belt 3 is provided in the expulsion zone 7 behind the driven deflection roller 17 in the lower region of the return run of the filter belt 3. A coarse scraper 36, for example in the form of a spatula device or of a wiper, which carries out a coarse, first cleaning off of the filter belt 3 is first provided at the lower run 3b of the filter belt 3 running off from the deflection roller 17. This coarse scraper 36 is advantageously movably supported with respect to its angular position and/or its setting depth or delivery position so that different engagement angles and/or different delivery angles or belt spacings can be set in dependence on the filter belt and process product. The named angular adjustability of the scraper support can in this respect be made with one axle or biaxially, with advantageously, on the one hand, the coarse scraper 36 being able to be tiltable about its longitudinal axis parallel to the plane of the filter belt 3 and rotatable about an axis perpendicular to the lower run 3b.

The named coarse scraper 36 can in this respect have different shapes, with a knife shape, wedge shape, flat shape, peak shape and drop shape having proved their value in an advantageous further development of the invention. The coarse scraper 36, which can in particular be formed as a web-shaped or strip-shaped wiper, can be made from different materials, for example from a plastic such as PE-UHM, but also PTFE, PA, PPS or POM, with metal also being able to be used. In a further development of the invention, a coating can be applied to the coarse scraper 36 in this respect, for example in the form of a wear-reducing coating for reducing the wear of the filter belt and/or in the form of a stiction-reducing coating such as Teflon to facilitate the release of the particles from the coarse scraper 36.

The fines cleaning off is effected in the drawn embodiment by means of a rotationally driven brush 8 which is likewise arranged at the return run of the filter belt 3 and is arranged spaced apart downstream of the coarse scraper 36. The named brush 8 can in this respect in particular be formed as a brush roller which is rotatably supported about a brush axis of rotation 37 which is advantageously arranged parallel to the plane of the lower run 3b and preferably perpendicular to the conveying direction of the filter belt 3, optionally slightly obliquely at an acute angle thereto.

The drive movement of the brush 8 can be derived, for example, from the drive of the filter belt 3 by means of a mechanical coupling in the form of a chain, a belt or a pinion arrangement, with the brush 8 being able to be driven in the same direction of or in the opposite direction to the filter belt 3, with a relative speed being produced by a correspondingly high drive speed with a drive movement in the same direction. In an advantageous further development of the invention, however, the brush 8 is driven by a drive 38 of variable speed with respect to the conveying speed of the filter belt 3, said drive, for example, being able to include a speed-variable drive motor in the form of an electric motor. Alternatively or additionally, the named drive 38 can also include a variable ratio transmission by means of which the drive movement could then again be derived from the drive of the filter belt or from the separate drive motor. The brush 8 is advantageously operated in the opposite direction to the filter belt 3.

In a further development of the invention, the drive speed of the brush 8 is controlled or regulated by a control apparatus 35, only indicated, to produce a degree of cleaning which is as high as possible. The control of the brush speed can in this respect be controlled in dependence on different variables, for example in dependence on the ratio of solids to liquid quantity, on filter load in the charging zone, on the solid type, on the solid and/or liquid temperature, on the particle size and/or on other operating parameters, as initially explained in more detail. For this purpose, the control apparatus 35 can be coupled with suitable detection means with the control apparatus 35 varying the brush speed in dependence of the their signals.

The strength of engagement of the brush 8 into the filter belt 3 is advantageously variable, in particular in dependence on the trimming shape of the brush and on the choice of the bristle material. Alternatively or additionally, further ones of the aforesaid operating parameters can be taken into consideration, for example such that on an insufficient degree of cleaning of a belt section monitored downstream of the brush 8, the contact pressure is increased. The brush 8 is advantageously movably supported for this purpose, in particular in a direction toward the filter belt 3 and away from the filter belt 3 so that the contact pressure can be varied. The setting apparatus associated with this movability can be designed as manual, advantageously, however, can also be provided with an adjustment apparatus powered by external energy so that the control apparatus 35 can control the contact pressure of the brush 8 in dependence on one or more of the aforesaid operating parameters.

To achieve a better cleaning, the speed and/or the contact pressure of the brush 8 can also be cyclically varied, for example such that the brush 8 is operated in an alternately reversing manner in the same direction of and in the opposite direction to the filter belt 3 and/or is operated at an increased rotational speed and/or an increased contact force on every nth revolution of the filter belt 3. Such cyclic variations of the brush speed and of the brush contact pressure can achieve improved cleaning results with simultaneously reduced filter belt wear.

The brush 8 can be made in one piece over the total width of the filter belt 3. A multi-part design or a design of the brush 8 divided into segments can, however, advantageously be provided, whereby a faster change of the brush is made possible.

Figure 8:
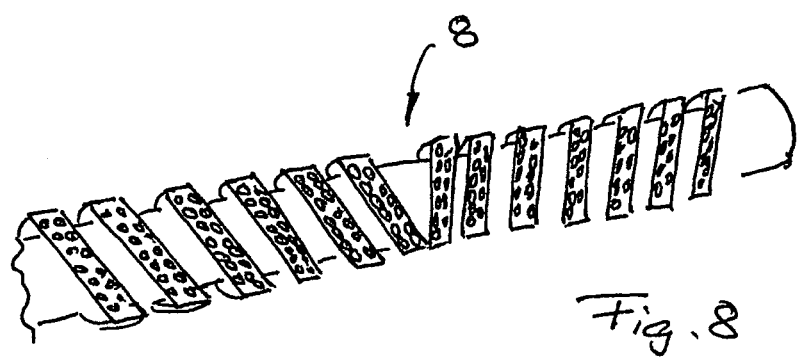
FIG. 8: a perspective, schematic view of the cleaning brush which shows the arrow-like oblique position of the bristle field in this embodiment.

The bristle portion of the brush 8 can likewise have different designs, for example in the form of a full trimming or of a loose tuft trim. In an advantageous further development of the invention, a structured brush trimming can be provided in which the work surface of the brush 8 formed by the bristle ends has defined, relief-like contour changes, for example in the form of columns of bristle field sections projecting higher and lower or the like. The bristle trimming can in particular have a screw-like section and/or a coil of one or more rows, with the wedge-shaped coil or section advantageously being able to be provided which is shown in FIG. 8 to achieve a homogenization of the particle removal transversely to the conveying direction.

The bristles for the bristle portion can be produced from different materials, with plastic or natural fibers being advantageous, but also with metal bristles being able to be provided, with optionally a coating being able to be provided.

To clean the brush 8, a brush cleaner 9 is provided which comprises, in the drawn embodiment, a brush scraper 10 which can advantageously be made in the form of a wiper. The named wiper can in this respect be a cylindrical round bar, optionally, however, also have a section in the manner of an extruded section or be provided with a section varying in the longitudinal direction, for example a coil or a screw section, in particular when the named wiper is rotationally drivable about its longitudinal axis.

Figure 7:
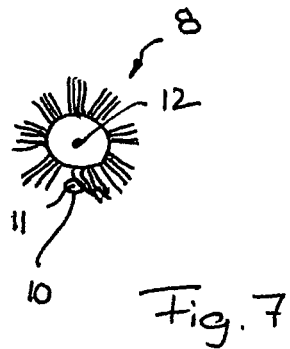
FIG. 7: an enlarged sectional view of a detail of the cleaning brush and of the cleaning wiper associated therewith which shows the arrangement of the cleaning wiper in the revolving region of the bristles.

As FIG. 7 shows, the brush scraper 10 is arranged with its longitudinal axis 11 substantially parallel to the axis of rotation 12 of the brush, with the brush scraper 10 being arranged immersed completely into the bristle field of the brush 8 in the drawn embodiment. To be able to adapt the cleaning of the brush 8 to the varying process conditions, the brush scraper 10 is advantageously movably supported. On the one hand, the position of the brush scraper 10 can be set advantageously, with the spacing from the axis of rotation 12 of the brush being able to be varied and/or with the position along the peripheral direction of the brush 8 being able to be varied. In the drawn embodiment, the brush scraper 10 is arranged at a position of 180°, i.e. precisely on the side of the brush 8 disposed opposite the filter belt 3. Depending on the position setting, the brush scraper 10 can, however, also be varied in a range from 90° to 270° in the peripheral direction of the brush, and in particular in a range from approximately 150° to 210°.

If the brush scraper 10 has a cross-section different from the circular in the aforesaid manner, the brush scraper can also be rotatably supported and be rotationally driven by a drive. The corresponding drive can advantageously also be made with variable speed here, with the already named control apparatus 35 being able to carry out an automatic setting or regulation of the speed, advantageously while taking account of at least one of the aforesaid operating parameters and/or additionally in dependence on the speed of the brush 8. The brush scraper 10 can, for example, be moved deeper into the bristle field of the brush 8 when a stronger cleaning effect is necessary, for example on a higher particle portion per water quantity. Alternatively or additionally, for example, the speed of the scraper can be increased if the particle size increases and larger particles have to be removed from the brush 8. Other variations of the position and/or the speed of the brush scraper 10 are moreover possible.

Figure 6:
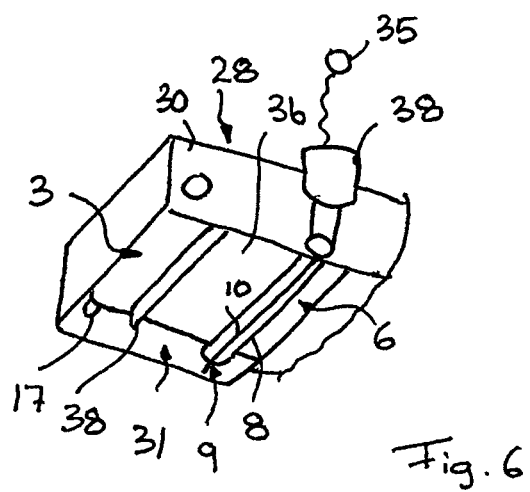
FIG. 6: a perspective representation of the expulsion zone of the filter belt obliquely from below which shows the named scraper and the named brush roll of the belt cleaner.

To prevent a splashback of the particles released from the brush 8 onto the filter belt 3, an impact surface 39, for example in the form of a deflector, is provided in the vicinity of the brush 8 and screens the brush 8 from a filter belt section adjacent to the brush 8, in particular from the filter belt section located at the downstream side of the brush 8, cf. FIG. 6.

A lead-off surface 18 is provided in the charging zone 5 of the filter belt 3 between its upper run 3a and its lower run 3b and can be made in the form of a lead-off plate which extends between the upper run and lower run and prevents process water which has leaked through the upper run from also passing through the lower run. This lead-off plate, which is located beneath the charging zone 5, can be centrally canted in the axial direction, i.e. in the conveying direction of the filter belt 3, in an advantageous further development of the invention and/or can have a V-shaped contour in the manner of a saddle roof to lead off liquid uniformly toward both sides. In this respect, flow direction elements which extend transversely to the conveying direction of the filter belt 3 on the lead-off surface 18 can be provided in the form of rails or webs to lead off the intercepted liquid laterally in a defined manner. It is ensured by the named lead-off surface 18 that the return run of the filter belt 3 is not contaminated and thus the deflection rollers 16 and 17 are also not contaminated.

In a further development of the invention, a belt guiding apparatus can be provided at the named lead-off surface 18, for example in the form of belt guiding rails which engage around or cover the side margins of the filter belt 8. The named belt guiding rails are advantageously made with two limbs, for example in L shape, so that the margins of the filter belt contact or lie on them and the charging zone is laterally bounded to prevent an overflow or flooding of the liquid to be filtered over the margins of the filter belt. At the same time, the named belt guiding rails prevent a kinking or falling down of the filter belt edge in the region of the liquid charging.

Figure 10:
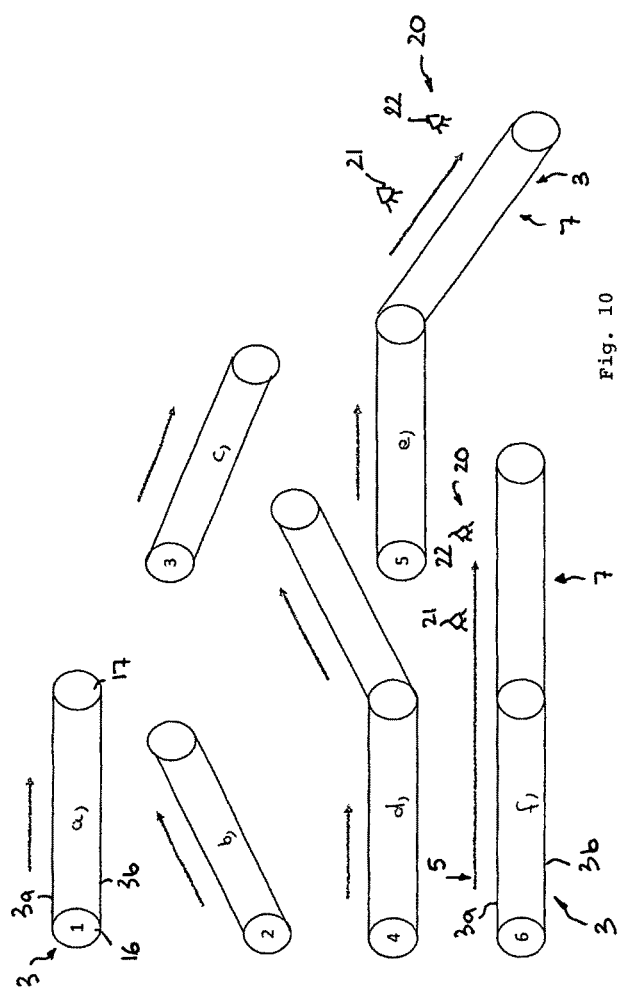
FIG. 10: a schematic representation of possible embodiments of the filter belt.

As FIG. 10 shows, the continuously revolving filter belt 5 can adopt different conveying paths and orientations. The embodiment of the revolving filter belt 3 marked by a) in FIG. 10 in a lying embodiment corresponds to the embodiment shown in the preceding Figures. Alternatively to this, the filter belt 3 can, however, also form a conveyor path slightly sloping upwardly from the charging zone or have such an orientation in accordance with b) or can form a conveyor path slightly downwardly sloping from the charging zone 5 or have such an orientation.

The filter belt 3 can furthermore run through mutually kinked conveyor paths which can be realized by more than two deflection rollers. For example, the part of the filter belt 3 located outside the filter housing 2 can run through an upward slope aligned with a slight acute angle, as the representation d) of FIG. 10 shows or can alternatively run through a slightly downwardly sloping conveying path, as the representation e) of FIG. 10 shows.

In accordance with representation f), the conveying path of the filter belt 3 provided outside the filter housing 2 can also simply be extended, for example to be able to provide additional treatment stations for the filtered process product. A drying apparatus 20 can in particular be provided between the charging zone 5 and the expulsion zone 7 by means of which the moisture content of the solids adhering to the filter belt 3 can be reduced. Such a drying apparatus 20 can, for example, also include energy radiators 21 in the form of infrared radiators, but can also include an air flow generator 22, for example in the form of a fan or of a suction device, to apply drying air to the solids. Alternatively or additionally, other drying means such as a cyclone separator, a vacuum pump or a heating radiator can also be used.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A filtration apparatus for filtering and separating solids from liquids, comprising at least one liquid-permeable, continuously or intermittently drivable filter belt, an intake for charging a liquid/solid mixture to be filtered onto the filter belt in a charging zone as well as a belt cleaner for removing solids deposited at the filter belt from a belt section conveyed out of the charging zone in an expulsion zone, said belt cleaner including a rotationally driven brush having bristles that define a bristle field, said brush including an associated brush cleaner having a scraper that is arranged in a revolving path of the bristle field of the brush, said scraper being arranged on a side of the brush that is opposite a side of the brush that faces the filter belt and is adjustable over an angular range from approximately 150° to 210° when a direction perpendicular to the filter belt is given at 0°, said scraper of the brush cleaner being formed as a bar-shaped wiper which is held completely immersed in the bristle field.

2. The filtration apparatus in accordance with claim 1, wherein the wiper has a cross-section differing from circular and is formed drivable about a rotational axis of the wiper substantially parallel to a rotational axis of the brush.

3. The filtration apparatus in accordance with claim 1, wherein the brush is driven by a drive motor at a rotational speed that is variable with respect to a filter belt speed and a control apparatus is provided for an automatic setting of the brush speed in dependence on an operating parameter selected from the group consisting of filter load, solid material and particle size.

4. The filtration apparatus in accordance with claim 1, wherein a contact pressure of the brush against the filter belt can be set, and a control apparatus is provided for an automatic setting of the contact pressure of the brush in dependence on an operating parameter selected from the group consisting of filter load, a ratio of a liquid quantity to a solid quantity, solid material and particle size.

5. The filtration apparatus in accordance with claim 1, wherein the filter belt has an upper run and a lower run that is substantially parallel with said upper run, the brush being in engagement with a lower side of the lower run of the filter belt.

6. A filtration apparatus for filtering and separating solids from liquids, comprising at least one liquid-permeable, continuously or intermittently drivable filter belt, an intake arranged in a filter housing, said intake for charging a liquid/solid mixture to be filtered onto the filter belt in a charging zone, and a belt cleaner for removing solids deposited at the filter belt from a belt section conveyed out of the charging zone in an expulsion zone, said belt cleaner including a rotationally driven brush having bristles that define a bristle field, said brush including an associated brush cleaner having a scraper that is arranged in a revolving path of the bristle field of the brush, the drivable filter belt being combined with the belt cleaner as part of an assembly, said assembly being made separately from the intake and from the filter housing and being slidably movable with respect thereto, said filter housing having a sliding guide and an upright housing wall with an insertion opening therein, the assembly being displaceably guided by the sliding guide to be at least partly pushed into and then pulled out of said filter housing through said insertion opening and as movably guided by said sliding guide in a manner like that of a drawer fitted to move in and out with respect to a cabinet that is configured to receive a drawer.

7. The filtration apparatus in accordance with claim 6, wherein the assembly forms a trolley which is supported on the floor by an undercarriage.

8. The filtration apparatus in accordance with claim 6, wherein the assembly has a connector collar surrounding the filter belt which is connectable to the filter housing so that a part of the assembly is arranged in an interior of the filter housing and a remaining part of the assembly including the belt cleaner and the expulsion zone is arranged outside the filter housing.

9. The filtration apparatus in accordance with claim 6, wherein the filter belt is made as a belt conveyor revolving around deflection rollers and has an upper run and a lower run, a lead-off surface being provided in a section of the belt conveyor disposed in the charging zone between the upper run and the lower run for leading off liquid filtered through the upper run past the lower run.

10. The filtration apparatus in accordance with claim 9, wherein belt guiding elements are provided at the lead-off surface which engage around or cover the upper run of the filter belt at lateral margins of said filter belt and laterally bounds the charging zone.

11. The filtration apparatus in accordance with claim 6, wherein a drying apparatus for drying the solids deposited at the filter belt is associated with the filter belt between the charging zone and the expulsion zone.

12. The filtration apparatus in accordance with claim 11, wherein the drying apparatus has at least one energy radiator for applying radiation energy to the deposited solids and/or has at least one air flow generator for applying a dry air flow to the deposited solids.

13. The filtration apparatus in accordance with claim 6, wherein a control apparatus is provided for an automatic setting of a filter belt speed in dependence on an operating parameter selected from the group consisting of a ratio of liquid quantity to solid quantity in the liquid/solid mixture to be filtered, filter load, solid material and particle size.

14. The filtration apparatus in accordance with claim 4, wherein the contact pressure of the brush against the filter belt is set by adjustability of a spacing of the axis of rotation of the brush from the filter belt.

15. The filtration apparatus in accordance with claim 8, wherein the connector collar surrounding the filter belt is connectable to the filter housing in a liquid-tight and/or gas-tight manner.

16. The filtration apparatus in accordance with claim 10, wherein the belt guiding elements are in the form of belt guiding rails.

17. The filtration apparatus in accordance with claim 12, wherein the air flow generator is a fan or a suction device and the energy radiator is an infrared radiator.

18. The filtration apparatus in accordance with claim 2, wherein the wiper has a cylindrical cross-section.

19. The filtration apparatus in accordance with claim 1, wherein the brush is driven by a drive motor of variable speed with respect to a conveying speed of the filter belt and may be operated in a same direction as, or in a direction opposite that of, the filter belt.

* * * * *